United States Patent [19]
Zehring et al.

[11] 3,889,787
[45] June 17, 1975

[54] HYDRAULIC SHOCK ABSORBER UNIT

[75] Inventors: Robert B. Zehring, Dayton; Richard W. Kinninger, Arcanum; Allan W. Miller, Dayton, all of Ohio

[73] Assignee: General Motors Corporation, Detroit, Mich.

[22] Filed: Oct. 5, 1973

[21] Appl. No.: 404,102

[52] U.S. Cl.............................. 188/317; 188/322
[51] Int. Cl............................................... F16f 9/19
[58] Field of Search................. 188/317, 322, 282

[56] References Cited
UNITED STATES PATENTS

| | | | |
|---|---|---|---|
| 1,806,338 | 5/1931 | Elsey | 188/282 |
| 2,800,981 | 7/1957 | Allinquant | 188/317 |
| 2,997,291 | 8/1961 | Stultz | 188/317 |
| 3,199,638 | 8/1965 | Otomo | 188/322 |
| 3,724,615 | 4/1973 | Stormer | 188/322 |
| 3,751,104 | 8/1973 | Thompson | 188/317 |
| 3,781,943 | 1/1974 | Cain | 188/317 |

FOREIGN PATENTS OR APPLICATIONS
1,107,155   12/1955   France.............................. 188/322

*Primary Examiner*—Trygve M. Blix
*Assistant Examiner*—Edward R. Kazenske
*Attorney, Agent, or Firm*—Saul Schwartz

[57] ABSTRACT

An automotive, hydraulic type shock absorber having a cylindrical pressure chamber filled with hydraulic fluid and an improved piston and piston rod subassembly, the improved subassembly including a piston having a flow controlling valve arrangement and an elongated pierced slot extending between the valve arrangement and one surface of the piston, the slot defining an elongated aperture at the intersection with the piston surface, and a cylindrical piston rod welded to the piston at the piston surface in overlapping relation with respect to the elongated aperture thereby to cooperate with the latter in defining a flow port between the slot in the piston and the shock absorber pressure chambers.

1 Claim, 5 Drawing Figures

PATENTED JUN 17 1975 3,889,787
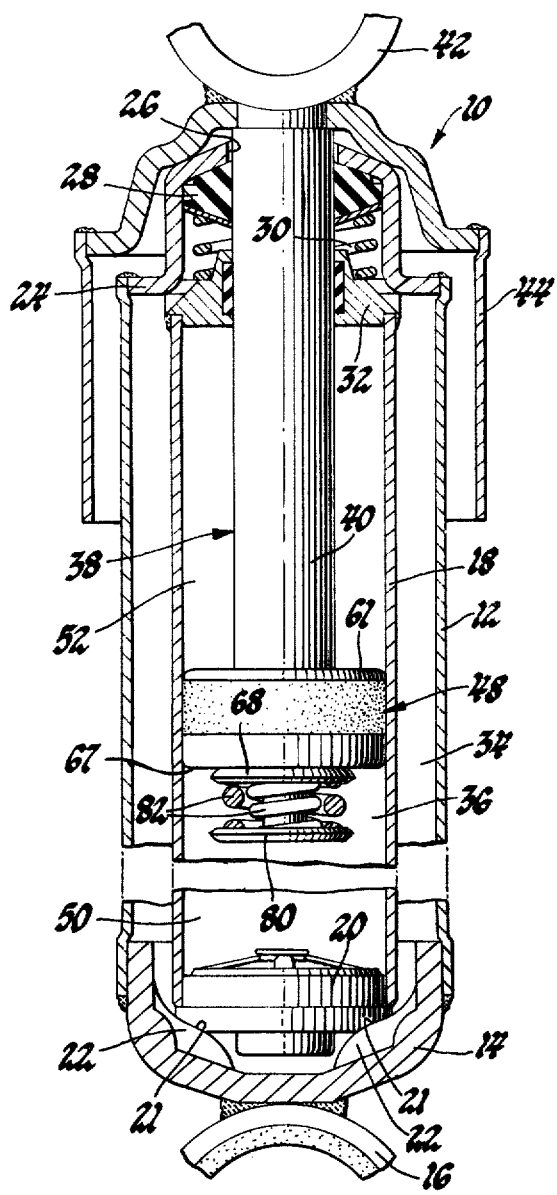
Fig. 1
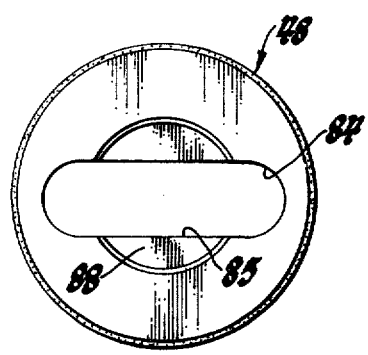
Fig. 5
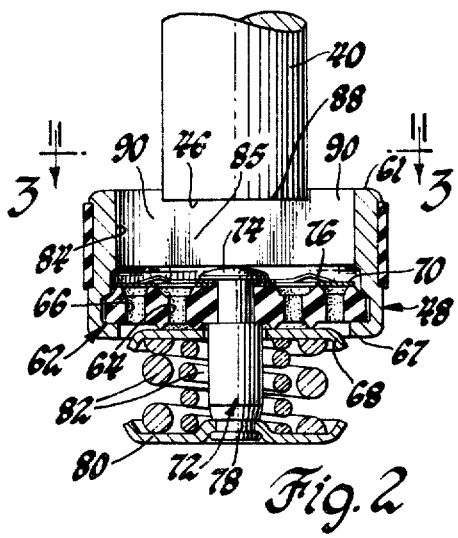
Fig. 2
Fig. 3
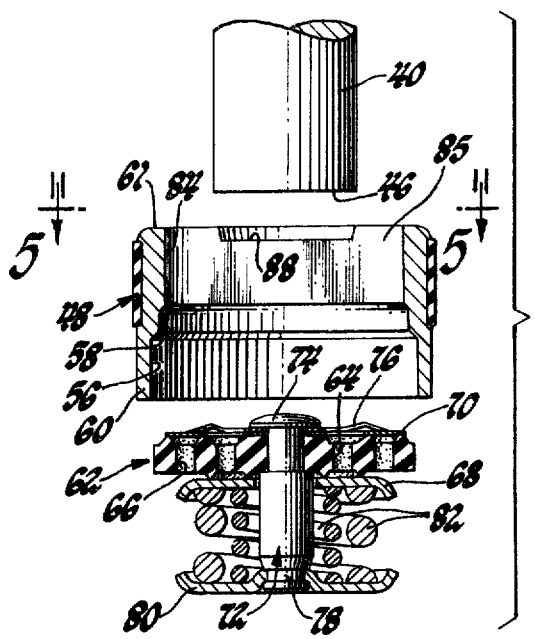
Fig. 4

HYDRAULIC SHOCK ABSORBER UNIT

This invention relates generally to hydraulic shock absorber units for automotive applications and more particularly to an improved piston and piston rod subassembly for such units.

Typical hydraulic shock absorber units for automotive applications include a cylindrical pressure chamber filled with hydraulic fluid and attached to one of the sprung and the unsprung mass portions of a vehicle. A piston having a flow control valve arrangement thereon is slidably disposed in the chamber and a piston rod, attached to the other of the sprung and the unsprung mass portions, projects into the chamber for rigid attachment to the piston. Relatively recently, it has been proposed to weld the piston rod to the piston. Such a construction requires passages through the piston to the valve arrangement, the passages, typically, being drilled at considerable cost. An improved piston and piston rod subassembly according to this invention incorporates a novel construction which eliminates the need for costly drilling and thereby renders the welded type subassemblies more economically attractive.

The primary feature, then, of this invention is that it provides an improved piston and piston rod subassembly for a hydraulic type automotive shock absorber unit. Another feature of this invention is that it provides an improved piston and piston rod subassembly including a piston portion supporting a flow controlling valve arrangement and having a slot extending between the valve arrangement and one side of the piston and a piston rod welded to the piston over the slot, the piston rod closing only a portion of the slot so that a non-drilled flow port is defined for directing fluid flow to and from the valve arrangement. Yet another feature of this invention resides in the provision of a slot in the piston which, at the intersection with the piston surface, defines an elongated aperture of length exceeding the diameter of the piston rod but of width less than the diameter of the piston rod so that when the piston rod is attached to the piston a pair of transversely spaced flow ports are defined on opposite sides of the piston rod.

These and other features of this invention will be readily apparent from the following specification and from the drawings wherein:

FIG. 1 is a sectional view of an automotive type shock absorber unit having a piston and piston rod subassembly constructed according to this invention;

FIG. 2 is an enlarged view of a portion of FIG. 1 showing the piston and piston rod subassembly;

FIG. 3 is a sectional view taken generally along the plane indicated by lines 3—3 in FIG. 2;

FIG. 4 is a view similar to FIG. 2 but showing structural elements of the piston and piston rod subassembly in exploded relationship; and FIG. 5 is a view taken generally along the plane indicated by lines 5—5 in FIG. 4.

Referring now to the drawings, FIG. 1 illustrates an automotive type shock absorber unit designated generally 10 including an outer cylinder 12 closed at one end by a cap 14 having a mounting eye 16 rigidly attached thereto. An inner cylinder 18 is disposed concentrically within the outer cylinder 12 and is closed at one end by a foot valve assembly 20 which rests on a plurality of lands 21 defined by a corresponding plurality of passages 22 extending between the portion of the cap 14 below the foot valve assembly and the annular space between the inner cylinder 18 and outer cylinder 12. At the end opposite the cap 14, the outer cylinder 12 is closed by a second cap 24 having a circular aperture 26 aligned on the longitudinal axis of the outer cylinder. An annular seal element 28 is disposed within the cap 24 and is biased against the upper end of the latter by a spring 30 seated on a second annular seal element 32 rigidly attached to the end of the inner cylinder 18 opposite the foot valve assembly 20. The annular space between the inner and outer cylinders defines a reservoir 34 and the interior of the inner cylinder 18 between the seal element 32 and the foot valve 20 defines a cylindrical pressure chamber 36. A piston and piston rod subassembly according to this invention and designated generally 38 is supported on the shock absorber 10 and projects into the pressure chamber 36 and functions conventionally, as described hereinafter, to dissipate kinetic energy.

As seen best in FIGS. 1 and 2, the piston and piston rod subassembly 38 includes a cylindrical piston rod 40 projecting through the circular aperture 26 in the cap 24 and slidably disposed in the annular seal elements 28 and 32. Outboard of the aperture 26 the piston rod 40 has rigidly attached thereto a mounting eye 42 and a shroud 44 covering the cap 24 and the upper end of the outer cylinder 12. The seals 32 and 28 cooperate in preventing the escape of hydraulic fluid which fills the pressure chamber 36 and a portion of the reservoir 34. Inboard of the seal 32, the piston rod 40 defines a circular end surface 46. Rigidly attached to the piston rod at the end surface 46, as described more fully hereinafter, is a piston 48, the piston dividing the pressure chamber 36 into a jounce compression chamber 50 below the piston and a rebound compression chamber 52 above the piston.

Referring particularly now to FIGS. 2, 3 and 4, the piston 48 is generally cylindrical in configuration and includes a central cylindrical cavity 56 having an annular shoulder 58 and a cylindrical wall portion 60. The upper end surface of the piston, FIGS. 1, 2 and 3, is exposed to the rebound compression chamber 52 and, hence defines a rebound compression surface 61. The piston further includes a circular orifice plate 62 disposed within the cavity 56 and seated against the shoulder 58, FIG. 2. The orifice plate 62 includes an inner circular array of throttling orifices 64 and an outer circular array of throttling orifices 66 and is retained within the cavity 56 by the wall portion 60 which is spun over around the orifice plate, FIG. 2. The orifice plate 62 and the spun over portion of the wall portion 60 are exposed to the jounce compression chamber 50 and, hence, cooperate in defining a jounce compression surface 67 of the piston.

As seen best in FIGS. 2 and 4, the piston 48 supports a flow controlling valve arrangement including a first valve plate 68 adapted to cover the inner array of throttling orifices 64 without covering the outer array of throttling orifices 66 and a second valve plate 70 adapted to cover the outer array of orifices 66 without impeding fluid flow through the inner array of orifices 64. A pin 72 is rigidly mounted in a central aperture in the orifice plate 62 and includes a head portion 74 which functions to retain the valve plate 70 and a spring 76 which biases the valve plate 70 to a closed position as shown. The pin 72 further includes an annular groove 78 in which is fitted a retainer 80, the retainer 80 functioning as a seat for a concentrically arranged pair of helical springs 82 which engage the valve plate 68 and bias the latter toward a closed position as shown.

Referring to FIGS. 2 through 5, the piston 48 further includes a pierced slot 84 extending between the base of the cavity 56 and the rebound compression surface 61 of the piston. The piston, initially, is cold formed from a wire slug into a generally cup-shaped configuration with one end closed by a solid section between the base of the cavity 56 and the rebound compression surface 61. Those skilled in the art will, of course, appreciate that the cold forming procedure can be readily extended to add one further step of piercing the section between the cavity 56 and the rebound compression surface 61 to form the slot 84. It will be further apparent that this piercing operation can be carried out at substantially less expense than a drilling operation wherein one or more smaller diameter holes would be drilled in the section between the cavity 56 and the rebound compression surface.

The slot 84 intersects the rebound compression surface and defines at the latter an elongated aperture 85 having a predetermined width less than the diameter of the piston rod 40 and a predetermined length exceeding the diameter of the piston rod. A circular rod end seat 88, FIG. 5, corresponding in diameter to the diameter of the piston rod is formed in the rebound compression surface 61 of the piston 48 and is adapted to receive the end surface 46 of the piston rod 40, FIG. 2. The piston rod is rigidly attached to the piston at the rod end seat 88 by a welding procedure involving application of pressure between the piston and the piston rod and the application of electrical weld current. For a full and complete description of an applicable welding procedure, reference may be made to U.S. Pat. No. 3,724,615, issued to Joseph R. Stormer on Apr. 3, 1973 and assigned to the assignee of this invention.

With the piston rod thus attached to the piston, the circumference of the piston rod end surface 46 intersects the marginal edge of the aperture 85 at four locations 89, FIG. 3, so that a substantial portion of the aperture, and hence the slot 84, is closed by the end surface of the piston rod. However, since the length of the aperture 85 exceeds the diameter of the piston rod, a pair of diametrically opposed flow ports 90, FIG. 3, are defined through cooperation of the opposite ends of the aperture 85 and the circumference of the piston rod 40. The flow ports 90, of course, permit fluid flow between the rebound compression chamber 52 and the cavity 56 through the slot 84.

Referring now particularly to FIGS. 1, 2 and 3 and describing the operation of the shock absorbing unit 10, the eye 16 is normally affixed to the unsprung mass of a vehicle and the eye 42 is similarly normally affixed to the sprung mass of the vehicle. As the vehicle moves along a road, irregularities in the road surface generate both jounce and rebound deflections of the unsprung mass relative to the sprung mass which deflections cause telescopic movement of the piston and piston rod subassembly 38 relative to the remainder of the shock absorber unit. More particularly, during jounce deflection the hydraulic fluid in the jounce compression chamber is placed in compression and forced through the outer array of orifices 66 and past the valve plate 70 into the cavity 56. A pressure drop occurs across the orifices 66 for absorbing or dissipating the kinetic energy of the sprung mass and the foot valve assembly exhausts a volume of fluid to the reservoir 34 equal to the increased volume occupied by the piston rod 40. From the cavity 56, the fluid is exhausted through the slot 84 and the ports 90 into the rebound compression chamber 52, the ports 90 having predetermined flow area sufficient to prevent any significant pressure drop between the cavity 56 and the rebound compression chamber 52.

Conversely, during rebound deflections the piston and piston rod subassembly 38 are telescopically extended relative to the remainder of the shock absorber unit so that the fluid in the rebound compression chamber 52 is placed in compression. The fluid is then conveyed via ports 90 and the slot 84 to the cavity 56, there again being no significant pressure drop across the ports 90. The pressurized fluid in the cavity 56 is forced through the inner circular array of orifices 64 and past the valve plate 68 with a pressure drop occurring across the orifices 64 for effecting energy absorption. Finally, the fluid is exhausted into the jounce compression chamber and the foot valve assembly 20 admits enough fluid from the reservoir 34 to fill the void left by withdrawal of the piston rod 40.

Having thus described the invention, what is claimed is:

1. In a piston and piston rod subassembly for disposition in a shock absorber pressure chamber filled with a hydraulic working fluid, said subassembly including a piston slidably disposed in said pressure chamber and dividing the latter into a jounce compression chamber and a rebound compression chamber, said piston having a jounce compression surface and a rebound compression surface exposed to respective ones of said jounce and said rebound compression chamber, valve means on said piston operative to control fluid flow across said piston between said jounce and said rebound compression chambers, and a cylindrical piston rod of predetermined diameter slidably disposed on said shock absorber and projecting into one of said jounce and said rebound compression chambers, the improvement comprising, means on said piston defining a slot extending between said valve means and said one of said jounce and said rebound compression chambers, said slot intersecting the corresponding one of said jounce and said rebound compression surfaces and defining thereat an elongated aperture of width less than said predetermined piston rod diameter and of length exceeding said predetermined piston rod diameter, and means rigidly connecting said piston and said piston rod at said corresponding one of said jounce and said rebound compression surfaces with the longitudinal axis of said piston rod intersecting the geometric center of said elongated aperture so that said piston rod overlaps the edges of said elongated aperture thereby to close a portion of said slot, said piston rod cooperating with said elongated aperture in defining a pair of laterally spaced flow ports on said piston.

* * * * *